United States Patent [19]

Kita

[11] 4,392,634
[45] Jul. 12, 1983

[54] ELECTROMAGNETIC VALVE

[75] Inventor: Toshio Kita, Osaka, Japan

[73] Assignee: Fujikin International, Inc., Osaka, Japan

[21] Appl. No.: 231,320

[22] Filed: Feb. 4, 1981

[30] Foreign Application Priority Data

Feb. 4, 1980 [JP] Japan .................................. 55-12829

[51] Int. Cl.³ .......................... F16K 31/06; H01F 7/12
[52] U.S. Cl. .................................... 251/129; 251/141;
335/245; 335/260
[58] Field of Search ....................... 251/129, 141, 130;
335/245, 278, 260

[56] References Cited

U.S. PATENT DOCUMENTS

| | | | |
|---|---|---|---|
| 3,307,129 | 2/1967 | Mangiafico | 335/260 |
| 3,712,581 | 1/1973 | Parlow | 251/129 |
| 3,974,998 | 8/1976 | Wood | 251/129 X |
| 4,027,850 | 6/1977 | Allen | 251/129 X |

FOREIGN PATENT DOCUMENTS 2225689 10/1973 Fed. Rep. of Germany ...... 251/129
485972 2/1970 Switzerland ........................ 251/141

Primary Examiner—Arnold Rosenthal
Attorney, Agent, or Firm—Armstrong, Nikaido, Marmelstein & Kubovcik

[57] ABSTRACT

An electromagnetic valve comprises a valve case having incorporated therein a member for closing a fluid channel through the valve case, a stationary core, a movable core aligned with the core, an exciting coil surrounding the cores, a support member fixed to the valve case for guiding the movement of the movable core, and a shading coil provided on one end of the stationary core which end is opposed to the movable core. The movable core is movable by a magnetic attracting force generated by the exciting coil to thereby operate the closing member. The support member extends toward the stationary core, and the extension is integrally formed with a disk portion in contact with the surface of the small-diameter end and a projecting edge covering the periphery of the small-diameter end. This end is fitted in the projecting edge, which is welded at its forward end to the stationary core.

3 Claims, 1 Drawing Figure

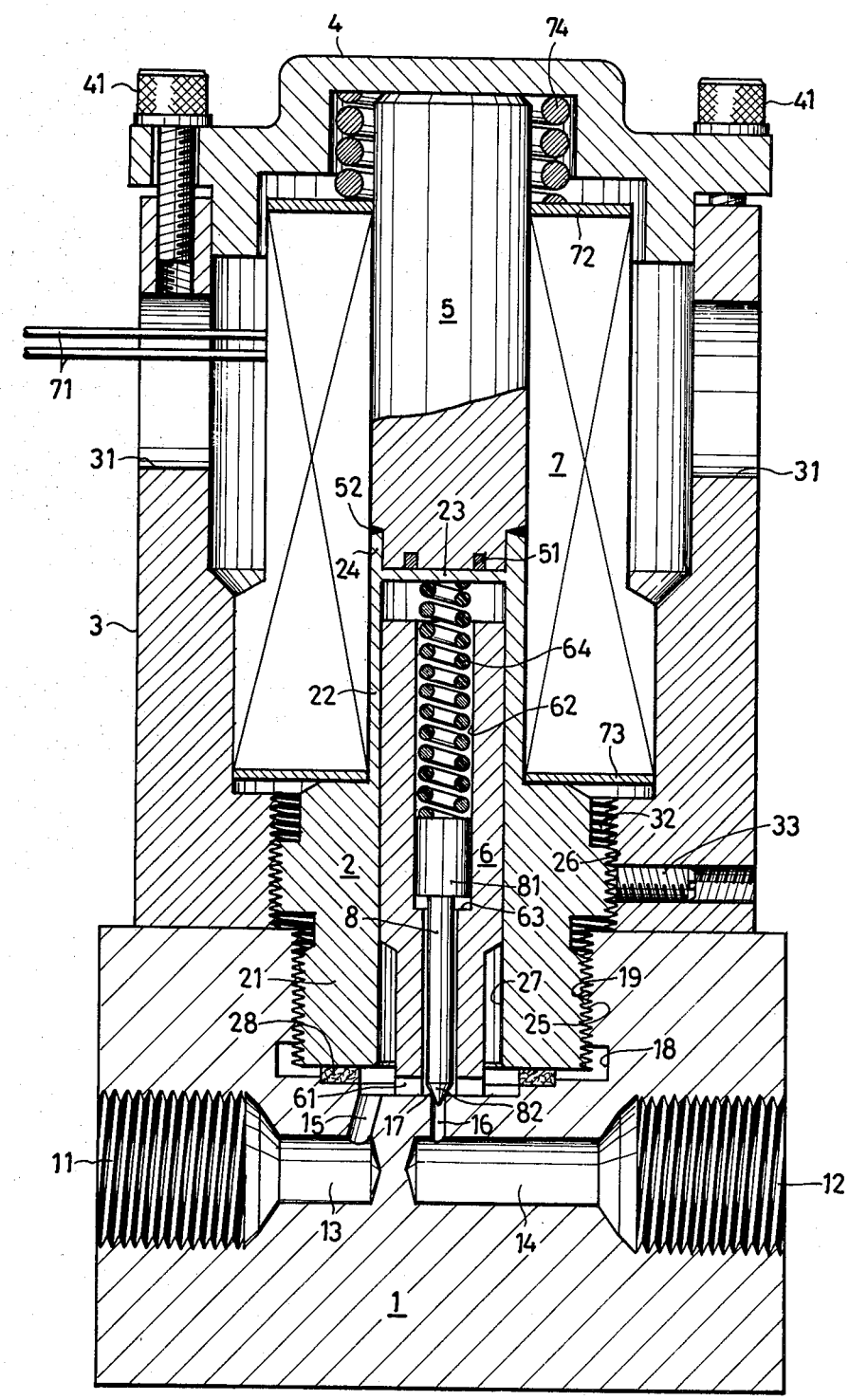

ELECTROMAGNETIC VALVE

BACKGROUND OF THE INVENTION

This invention relates to an electromagnetic valve having an exciting coil to be energized by an a.c. power supply and usable for corrosive fluids.

Electromagnetic valves include an exciting coil which is energized by a d.c. power supply or by an a.c. power supply. D.c. electromagnetic valves are advantageous in that they do not involve chattering but a d.c. power supply must be prepared for the operation of the valve. A.c. electromagnetic valves are operable directly by the commercial a.c. power supply and are therefore widely used. However, the exciting coil of the valve, when energized with a.c. current, produces a magnetic force of varying magnitudes and accordingly a varying attracting force. Consequently the valve stem and other members constituting the valve vibrate at twice the line frequency. This phenomenon is called chattering. Needless to say, chattering impairs the function of the valve.

To prevent chattering, the core of the exciting coil is provided with a shading coil, which usually is a ring of thick copper wire. The change of the magnetic flux of the exciting coil induces an electromotive force on the shading coil, thereby generating a flow of current through the shading coil. The current produces a magnetic flux. Since the flux is produced by the shading coil some time later than the magnetic flux of the exciting coil, the changes of the combined fluxes are smaller than otherwise, whereby chattering is precluded.

On the other hand, when such an electromagnetic valve is used for controlling an aqueous alkali solution or some other corrosive fluid, the fluid will flow to the location of the core of the exciting coil or of the shading coil on the core, possibly causing corrosion to the core or the shading coil. The core which must of course be a magnetic body also needs to have corrosion resistance when the valve is used for corrosive fluids. While magnetic stainless steel is sometimes used for the core, the stainless steel is less resistant to corrosion than nonmagnetic stainless steel. Further the shading coil, which is generally made of copper, is more susceptible to corrosion.

SUMMARY OF THE INVENTION

An object of the present invention is to provide an electromagnetic valve which is adapted for use with an a.c. power supply for energizing its exciting coil and which is usable for corrosive fluids without the likelihood of corrosion of its stationary core or shading coil.

Another object of the invention is to provide an electromagnetic valve which is operable free of chattering when the exciting coil is energized by an a.c. power supply.

The electromagnetic valve of this invention includes a valve case having incorporated therein a member for closing a fluid channel through the valve case, a stationary core and a movable core arranged in alignment with each other, an exciting coil surrounding the cores, a support member fixed to the valve case for guiding the movement of the movable core, and a shading coil provided on one end of the stationary core which end is opposed to the movable core. The exciting coil generates a magnetic attracting force which moves the movable core, which in turn operates the channel closing member. The end of the stationary core provided with the shading coil has a small diameter. The support member extends toward the stationary core, and the extension is integrally formed with a disk portion in contact with the surface of the small-diameter end and is also integrally formed with a projecting edge covering the periphery of the small-diameter end. The small-diameter end is fitted in the projecting edge, which in turn is welded at its forward end to the stationary core. The support member is made of a nonmagnetic material.

Since the end of the stationary core where the shading coil is provided is completely covered with the disk portion and projecting edge of the support member, there is no likelihood that the end portion will be exposed to corrosive fluids. Thus the stationary core and the shading coil can be protected against corrosion. With the forward end of the projecting end welded to the stationary core, there is no need to weld the disk portion to the stationary core. This enables the disk portion to have a reduced thickness, permitting the shading coil to effectively exert its magnetic attracting force on the movable core to prevent chattering.

The present invention will become more apparent from the following description of the preferred embodiment with reference to the accompanying drawing.

BRIEF DESCRIPTION OF THE DRAWING

The drawing is a sectional view showing an electromagnetic valve embodying the invention.

DESCRIPTION OF THE PREFERRED EMBODIMENT

The electromagnetic valve shown includes a valve case 1 having a fluid inlet 11 and a fluid outlet 12, a support 2 fixed to the valve case 1, a coil casing 3 fixed to the support 2, a cap 4 fitting over the casing 3, a stationary core 5 and a movable core 6 which are aligned in a direction at right angles with a line through the inlet 11 and outlet 12 of the valve case 1, and an exciting coil 7 housed in the casing 3 and surrounding the cores 5 and 6.

The valve case 1 has a large cavity in its upper side. The case 1 is internally threaded as at 19 on its inner periphery defining the cavity 18. The support 2 comprises a lower half portion serving as an attaching portion 21 and a hollow cylindrical portion 22 extending upward from the portion 21. The attaching portion 21 is formed, at upper and lower parts, with externally threaded portions 26 and 25, respectively. The lower externally threaded portion 26 of the support 2 are screwed in the cavity 18 of the valve case 1, whereby the support member 2 is firmly fixed to the valve case 1. An annular gasket 28 is interposed between the lower end face of the support 2 and the bottom of the cavity 18.

The support 2 is centrally formed with a bore 27 which extends vertically upward into the cylindrical portion 22. The lower end of the bore 27 is open. The upper end of the bore 27 is closed with a disk portion 23 formed at the upper end of the cylindrical portion 22. The peripheral wall of the cylindrical portion 22 extends upward further beyond the disk portion 23 to provide a projecting edge 24. These disk portions 23 and the projecting edge 24 are integral with the cylindrical portion 22.

The movable core 6 is accommodated in the bore 27 vertically movably. The lower portion of the movable core 6 has a smaller diameter. The movable core 6 has a bore 62 vertically extending through its center. The lower half portion of the bore 62 is smaller than the upper half portion thereof in inside diameter, with a step 63 formed between these portions. Radial grooves 61 for passing a fluid therethrough are formed in the lower end face of the movable core 6.

A valve stem 8 is accommodated in the bore 62 of the movable core 6 and has a conical lower end. The conical portion, indicated at 82, acts to open or close the valve. The valve stem 8 has at its upper end a large-diameter head portion 81 which is accommodated in the large-diameter upper half portion of the bore 62. The upper half portion of the bore 62 further has accommodated therein a spring 64 extending between the disk portion 23 and the head portion 81 of the valve stem 8. The valve stem 8 is biased downward by the spring 64 at all times.

The valve case 1 has passages 13 and 14 inwardly extending from the inlet 11 and the outlet 12 respectively. Passages 15 and 16 extend upward approximately from the terminal ends of the passages 13 and 14, respectively, and are open to the cavity. Thus a fluid channel extends from the inlet 11, through the passages 13, 15, the grooves 61 and the passages 16, 14 to the outlet 12. The upper end of the passage 16 provides a valve seat 17. The conical end 82 of the valve stem 8 bears on the valve seat 17. Since the valve stem 8 is biased downward by the spring 64 at all times, the passage 16 is held closed by the conical end 82 of the valve stem 8. The inlet 11 and the outlet 12 are internally threaded for connection to pipes.

The coil casing 3 is fixed to the support 2 by an internally threaded portion 32 thereof screwed on the upper externally threaded portion 26 of the support 2. A retaining screw 33 screwed into the casing 3 bears at its forward end against the threaded portion 26 of the support 2. The cap 4 is secured to the casing 3 with bolts 41. Annular washers 72 and 73 are disposed at the upper and lower ends of the exciting coil 7. Provided between the cap 4 and the upper washer 72 is a spring 74 which tightly presses the exciting coil 7 against the attaching portion 21 of the support 2, whereby the coil 7 is fixed in position. The lead wires 71 of the coil 7 extend outward from the casing 3 through an opening 31 and are connected to a suitable a.c. power supply, for example, to the commercial a.c. power line.

The stationary core 5 positioned between the cap 4 and the cylindrical portion 22 of the support 2 is thereby tightly held in position. The lower end of the stationary core 5 has a smaller outside diameter than the other portion. A shading coil 51 is fitted in the surface of the small-diameter end. The shading coil is a ring made by a turn of thick copper wire. An annular groove is formed in the lower end face of the core 5 and has the copper ring fitted therein. The small-diameter lower end of the core 5 is fitted in the projecting edge 24 formed at the upper end of the cylindrical portion 22 of the support 2. The upper end of the projecting edge 24 is secured to the stationary core 5 by welding. The disk portion 23 is in intimate contact with the lower end face of the core 5. It is preferable that the diameter of the shading coil 51 be as large as possible within the range of the outside diameter of the small-diameter lower end of the stationary core 5.

The valve case 1, support 2, movable core 6, valve stem 8 and spring 64 are made from a corrosion-resistant material, such as stainless steel. At least the support 2 is made of a nonmagnetic material.

When an a.c. current flows through the exciting coil 7, the coil 7 produces a magnetic flux passing through the cores 5 and 6, with the result that the movable core 6 is drawn toward the stationary core 5. The movement of the core 6 brings the step 63 in the bore 62 of the core 6 into striking contact with the head portion 81 of the valve stem 8, consequently forcing the valve stem 8 also toward the stationary core 5 against the force of the spring 64. This moves the conical end 82 of the valve stem 8 away from the valve seat 17 to open the passage 16.

The changes of the magnetic flux produced by the exciting coil 7 induces an electromotive force on the shading coil 51, thereby generating a flow of current through the coil 51. The current flowing through the shading coil 51 also produces a magnetic flux. This flux is generated by the coil 51 some time later than the flux produced by the coil 7 and is also combined with the flux produced by the coil 7. Thus the magnetic flux of the shading coil 51 is combined with that of the exciting coil 7 which changes with $\frac{1}{2}$ the period of the a.c. power line, so that the resulting changes of the combined fluxes are smaller. As a result, the chattering of the movable core 6, and therefore of the valve stem 8, can be prevented.

As already described, the upper end of the cylindrical portion 22 of the support 2 is integrally formed with the disk portion 23 closing the upper end and also with the upwardly projecting edge 24. The upper end of the edge 24 is welded to the stationary core 5, with the disk portion 23 in intimate contact with the lower end face of the stationary core 5. The disk portion 23, which is not welded, can be made thinner. This permits the magnetic flux of the shading coil 51 to act on the movable core 6 fully and effectively prevent chattering. The residual stress resulting from the welding of the projecting edge acts to contract the welded portion 52, thereby forcing the disk portion 23 into contact with the lower end face of the stationary core 5. The pressing contact of the disk portion 23 with the lower end face of the stationary core 5 eliminates the clearance therebetween and is also useful for the prevention of chattering.

For example, it is assumed that the lower end of the stationary core 5 has the same diameter as the other portion thereof and that the cylindrical portion of the support 3 is not formed with the projecting edge 24. In this case, the disk portion only is formed at the upper end of the cylindrical portion 22. The disk portion will be welded along its peripheral edge to the periphery of the lower end of the stationary core. The disk portion, which is thus welded directly, must have an increased thickness. The magnetic flux of the shading coil 51 then will not act on the movable core 6, permitting chattering. The welding of the disk portion further produces strain, which prevents intimate contact of the disk portion with the lower end face of the stationary core and create a clearance. As a result, the disk portion acts as a kind of plate spring which produces marked chattering.

The lower end of the stationary core 5 is completely covered with the disk portion 23 and the projecting edge 24, so that even if a corrosive fluid entered the bore 27 of the support 2, the stationary core 5 and the shading coil 51 will not be exposed to the fluid and is protected from corrosion. The stationary core 5 and the shading coil 51 need not be made from a corrosion-resistant material.

I claim:

1. An electromagnetic valve comprising:

a valve case having a fluid inlet, a fluid outlet and a channel holding the inlet in communication with the outlet, the channel being provided with a valve seat, a valve stem having a closing member for blocking the channel by contact with the valve seat, a movable core supporting the valve stem movably to bring the closing member into or out of contact with the valve seat, a spring biasing the valve stem in a direction to bring the closing member into contact with the valve seat, a support comprising a hollow cylindrical portion and an attaching portion fixed to the valve case for supporting the movable core movably, a stationary core aligned with the movable core, an exciting coil surrounding the movable core and the stationary core, and a shading coil provided on an end surface of the stationary core which surface is opposed to the movable core, the stationary core having a small diameter at the end thereof provided with the shading coil, the cylindrical portion of the support extending toward the stationary core, the cylindrical portion being integrally formed with a disk portion in contact with the end surface of the stationary core and a projecting edge covering the periphery of the small-diameter end of the stationary core, the small-diameter end fitting in the projecting edge with the forward end of the projecting edge welded to the stationary core.

2. An electromagnetic valve as defined in claim 1 wherein the valve case, the valve stem, the movable core and the support are made of a corrosion-resistant material.

3. An electromagnetic valve as defined in claim 1 wherein the support is made of a nonmagnetic material.

* * * * *